(12) United States Patent
Wynn et al.

(10) Patent No.: US 12,251,919 B2
(45) Date of Patent: Mar. 18, 2025

(54) ELECTRIC VEHICLE BATTERY PACK COVER HAVING COMPOSITE STRUCTURE

(71) Applicant: Rivian IP Holdings, LLC, Plymouth, MI (US)

(72) Inventors: Nathaniel C. Wynn, Tustin, CA (US); Tyler Collins, Irvine, CA (US); Kyle Butterfield, Rancho Santa Margarita, CA (US); Kai Yamamoto, Irvine, CA (US); Vignesh Sekar, Westland, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 509 days.

(21) Appl. No.: 16/678,310

(22) Filed: Nov. 8, 2019

(65) Prior Publication Data
US 2020/0152926 A1 May 14, 2020

Related U.S. Application Data

(60) Provisional application No. 62/760,554, filed on Nov. 13, 2018.

(51) Int. Cl.
*B32B 5/02* (2006.01)
*B32B 5/26* (2006.01)
(Continued)

(52) U.S. Cl.
CPC ............... *B32B 5/028* (2013.01); *B32B 5/26* (2013.01); *B32B 15/14* (2013.01); *B32B 15/20* (2013.01);
(Continued)

(58) Field of Classification Search
CPC . H01M 50/155; H01M 2220/20; B32B 5/028; B32B 5/26; B32B 15/14;
(Continued)

(56) References Cited

U.S. PATENT DOCUMENTS 5,817,434 A * 10/1998 Brooker ............ H01M 10/6557
429/49
8,465,864 B1 * 6/2013 Kwak ............... H01M 10/6555
429/120
(Continued)

FOREIGN PATENT DOCUMENTS

CN 103403913 A 11/2013
CN 107 681 083 2/2018
(Continued)

OTHER PUBLICATIONS

Arctic Minerals "BriteFlex® to Replace Wetground Mica in Barrier Coatings" https://www.arcticminerals.com/briteflex-to-replace-wetground-mica-in-barrier-coatings/#:~:text=The%20hard%20mica%20plates%20resist,ratio%20mica%20outperforms%20other%20products (Year: 2022).*
(Continued)

*Primary Examiner* — Alicia J Weydemeyer
*Assistant Examiner* — Laura B Figg
(74) *Attorney, Agent, or Firm* — Haley Guiliano LLP

(57) ABSTRACT

An electric vehicle battery pack cover with a fiber reinforced multiple-ply composite body whose bottom surface is coated with a high-hardness, high-melting point, and fire- and abrasion-resistant coating. The coating can be any one or more materials that provide sufficient fire and abrasion resistance to allow the battery pack to contain a battery fire. As examples, the coating can be a nickel layer, a steel layer, a high temperature mineral layer such as a mica layer, or any combination of these materials. The composite body can be any composite body that is both compatible with the fire- and abrasion-resistant coating and provides sufficient strength to act as a battery cover. As examples, the composite body can be made of one or more glass fiber plies, carbon fiber plies, aramid fiber plies, or any combination of
(Continued)

any number of these plies, with a crosslinked polymer or other matrix.

20 Claims, 2 Drawing Sheets

(51) Int. Cl.
  *B32B 15/14* (2006.01)
  *B32B 15/20* (2006.01)
(52) U.S. Cl.
  CPC ....... *B32B 2255/10* (2013.01); *B32B 2255/26* (2013.01); *B32B 2264/102* (2013.01); *B32B 2307/3065* (2013.01); *B32B 2307/536* (2013.01); *B32B 2307/584* (2013.01); *B32B 2457/10* (2013.01); *H01M 2220/20* (2013.01)
(58) Field of Classification Search
  CPC . B32B 15/20; B32B 2255/10; B32B 2255/26; B32B 2264/102; B32B 2307/3065; B32B 2307/536; B32B 2307/584; B32B 2457/10
  See application file for complete search history.

(56) References Cited

U.S. PATENT DOCUMENTS

| | | | |
|---|---|---|---|
| 2005/0170238 A1 | 8/2005 | Abu-Isa et al. | |
| 2010/0136386 A1* | 6/2010 | Holung | H01M 50/325 |
| | | | 429/56 |
| 2011/0076550 A1* | 3/2011 | Liang | H01M 50/502 |
| | | | 429/175 |
| 2011/0165454 A1* | 7/2011 | Iwamoto | H01M 50/24 |
| | | | 429/163 |
| 2011/0300431 A1* | 12/2011 | Smith | H01M 10/052 |
| | | | 429/149 |
| 2013/0252059 A1* | 9/2013 | Choi | B29C 70/20 |
| | | | 429/100 |
| 2014/0054196 A1* | 2/2014 | Schaefer | B32B 15/18 |
| | | | 206/703 |
| 2018/0261811 A1 | 9/2018 | Kellner | |

FOREIGN PATENT DOCUMENTS

| | | |
|---|---|---|
| CN | 108 183 181 | 6/2018 |
| CN | 108574064 A | 9/2018 |
| DE | 10 2016 207320 | 11/2017 |
| EP | 1 585 181 | 10/2005 |
| JP | 5 703504 | 4/2015 |
| KR | 10-2013-0008077 A | 1/2013 |
| KR | 10-2013-0107823 A | 10/2013 |
| WO | WO2005076387 * | 8/2005 |

OTHER PUBLICATIONS

International Search Report and Written Opinion of PCT/US2019/060458 dated Apr. 30, 2020.

Nickel Borisevich, "Industrial Mineral Raw Materials,"Geological Press, Oct. 31, 1955, 7 pages. (Chinese language, Google translation attached).

Xinjiang Non-metal Mine Design Institute, China Architecture and Building Press, Mica, Jul. 31, 1977, 9 pages. (Chinese language, Google translation attached).

* cited by examiner

ELECTRIC VEHICLE BATTERY PACK COVER HAVING COMPOSITE STRUCTURE

CROSS REFERENCE TO RELATED APPLICATION

This application claims the benefit of U.S. Provisional Patent Application No. 62/760,554, filed Nov. 13, 2018, the disclosure of which is hereby incorporated by reference herein in its entirety.

The present disclosure is directed to battery pack covers having composite structures. More specifically, the present disclosure is directed to electric vehicle battery pack covers having composite structures.

SUMMARY

A vital component of current electric vehicles is the battery pack. Conventional battery packs perform a number of functions, including providing a protective enclosure to withstand crash or other impacts, routing of electrical wires, and containment of battery fires.

Battery packs may have a frame that provides the structural rigidity and strength to withstand impact, a bottom layer, and a top layer or lid. As shown in FIG. 1, the pack lid 100 sits atop the frame and is affixed thereto to cover the battery modules, which are not shown but which are contained within the frame.

Traditionally, battery pack lids or covers have been constructed with a steel layer, whose high tensile strength and high melting point give the cover sufficient rigidity and strength to act as a shear panel in the event of impact, and to resist the high heat and grit of flame jets from battery fires. However, steel has a relatively high density and in order to compensate for its weight, steel covers are typically designed to be made thin, which results in excess flexibility causing undesirable vibrational modes and noise properties.

Accordingly, described herein is an improved battery pack cover having a composite structure. More specifically, the battery pack cover of the present disclosure has a fiber reinforced multiple-ply composite body whose bottom surface is coated with a high-hardness, high-melting point, fire- and abrasion-resistant coating. The cover thus acts as physical protection for the batteries, i.e., a shear panel and cover preventing foreign objects from contacting the batteries, and as a fire-resistant barrier preventing battery fires from damaging the rest of the vehicle or injuring passengers.

The cover can take on any number of different configurations. Embodiments of the disclosure contemplate any fire- and abrasion-resistant coating that allows for sufficient containment of battery fires. Examples include a nickel layer, a steel layer, a high temperature mineral layer such as a mica layer, or any combination of these materials. In various embodiments, these materials allow for a coating layer of sufficient hardness to deflect grit from flame jets of the one or more batteries, and with a melting point temperature greater than the temperature at which ablation of the coating layer occurs. This provides both fire and abrasion resistance, allowing the cover to sufficiently contain battery fires. The coating layer may have any thickness sufficient to provide both fire and abrasion resistance. In one exemplary embodiment, coating layers made from the above materials may have a thickness of approximately 50 to approximately 100 µm.

Embodiments of the disclosure also contemplate any fiber reinforced composite body that is both compatible with the fire- and abrasion-resistant coating and provides sufficient strength to act as a battery cover. Examples include a composite body made of one or more glass fiber plies, carbon fiber plies, aramid fiber plies, or any combination of any number of these plies. The body may employ any matrix, with one example being a crosslinked polymer such as an epoxy matrix. Fiber plies may be of any thickness, with one example being 1.5 mm.

An additional metallic layer may be provided, to reduce electromagnetic interference between the batteries, their various conductive elements, and any vehicle systems. This metallic layer may be made of any metallic material of any thickness, with one example being a 0.48 mm aluminum foil layer. The metallic layer may be affixed to any surface of the cover, such as a top surface, a bottom surface facing the batteries when assembled, or between the composite body and coating layer. The metallic layer may also be integrated into the composite body, e.g., the metallic layer may be a ply of the composite body. The overall thickness of the cover, including composite body, coating layer, and metallic layer, may be of any thickness, with one example being 1.5 mm overall thickness. Finally, the metallic layer may include other materials in addition to one or more metallic materials. For instance, the metallic layer may be a continuous metal layer such as aluminum, with a glass mesh incorporated therein or affixed thereto.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to an electric vehicle battery pack cover with a fiber reinforced multiple-ply composite body whose bottom surface is coated with a high-hardness, high-melting point, fire- and abrasion-resistant coating. The coating can be any one or more materials that provide sufficient fire and abrasion resistance to allow the battery pack to contain a battery fire. As examples, the coating can be a nickel layer, a steel layer, a high temperature mineral layer such as a mica layer, or any combination of these materials. The composite body can be any composite body that is both compatible with the fire- and abrasion-resistant coating and provides sufficient strength to act as a battery cover. As examples, the composite body can be made of one or more glass fiber plies, carbon fiber plies, aramid fiber plies, or any combination of any number of these plies, with a crosslinked polymer or other matrix. A metallic layer, such as an aluminum layer, may also be affixed to any surface of the cover or coating.

Figure 1:
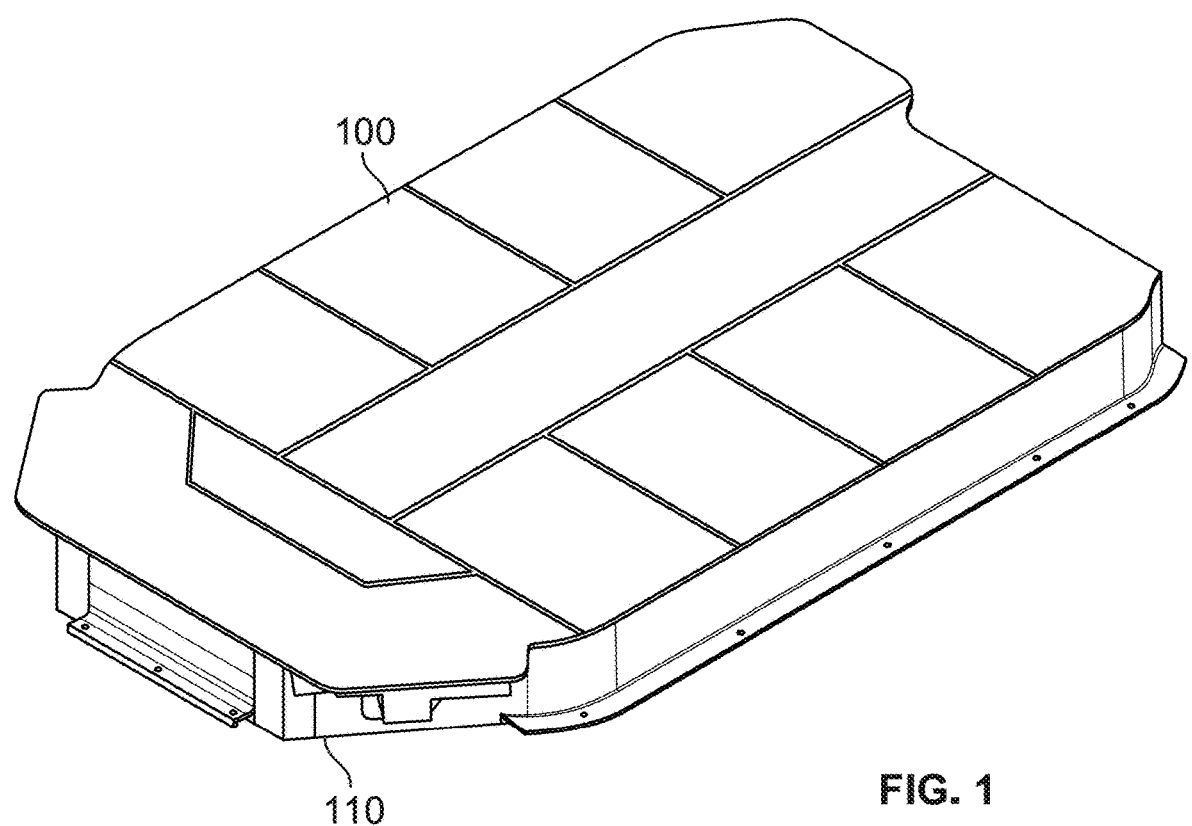
FIG. 1 is an isometric view of an electric vehicle battery pack assembly having a cover constructed in accordance with embodiments of the disclosure.

FIG. 1 is an isometric view of an electric vehicle battery pack assembly having a cover constructed in accordance with embodiments of the disclosure. Here, the battery pack assembly includes a cover 100 and frame 110 to which it is affixed, such as by screws, bolts, or the like. A number of batteries are positioned and secured within the frame 110, and the frame 110 is affixed to an electric vehicle, where it provides electrical power to operate the vehicle. In some embodiments, the batteries are arranged into separate battery modules and the battery module are individually positioned and secured within the frame 110. In one example, eight rectangular battery modules are included in the battery pack assembly.

Figure 2:
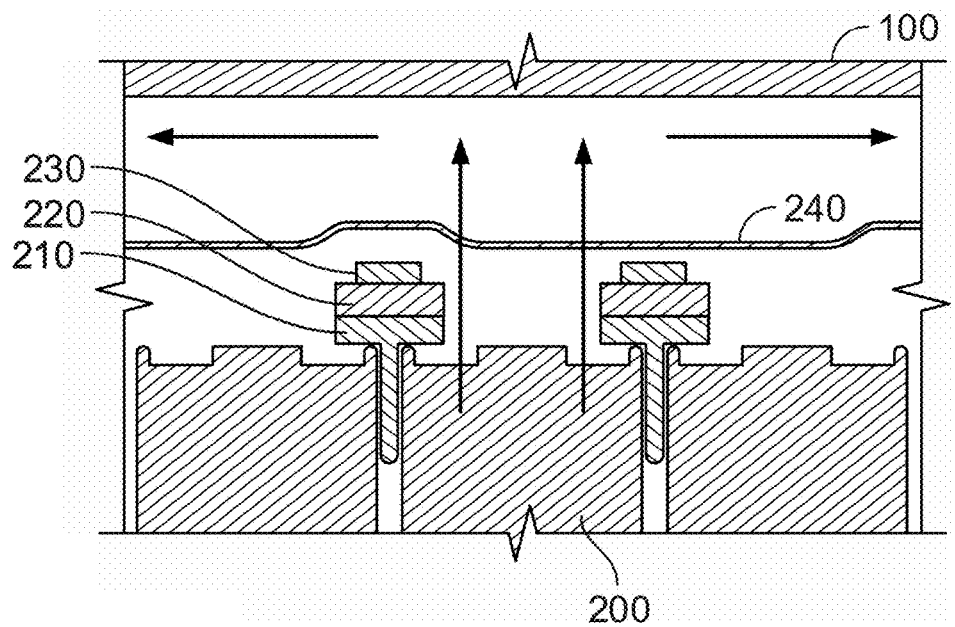
FIG. 2 is a partial cross-sectional view of the battery pack assembly of FIG. 1.

FIG. 2 is a partial cross-sectional view of the battery pack assembly of FIG. 1, illustrating the interior of the battery pack when assembled. A number of batteries 200 are secured within the frame, with a members each containing a spacer 210, busbar 220 for electrically connecting to the batteries 200, and nonconductive structural layer 230 providing electrical terminals, maintaining space between adjacent batteries 200 and helping to secure the batteries 200 to the bottom of frame 110. The batteries 200 are positioned within battery module housing 240.

When a battery catches fire (e.g., due to a thermal runaway event), it typically emits a jet of grit-infused flame. The flame typically emanates from a safety valve or cap of a battery cell, which is usually located at the top of the cylindrical battery cell. The arrows of FIG. 2 show the direction of the grit-infused flame when one of the battery cells 200 catches fire. The heat and abrasive grit can quickly wear holes in battery module housing 240 and conventional covers, allowing flames to escape therethrough and damage the vehicle or injure passengers. However, the fire- and abrasion-resistant coating of cover 100 resists the heat and grit of battery fires, directing the flames laterally away and preventing burn-through. This contains battery fires within the frame 110, preventing vehicle damage and passenger injury.

More specifically, when the cover 100 is affixed to the frame 110 as shown in FIG. 1, the coating layer faces downward, toward the batteries within the frame. When a battery fire occurs, grit-infused flames are directed upward from the batteries toward the coating. The fire- and abrasion-resistant coating resists the heat and abrasion of the fire and grit, redirecting the fire laterally along the surface of the cover as shown by the arrows of FIG. 2. Even if the fire burns through the coating, the polymer layers of the multiple-ply composite ablate in the presence of fire, thereby removing heat from the cover 100. It has been determined that, collectively, the coating and ablative polymer layers of the cover 100 are sufficient to prevent battery fires of common duration and intensity from penetrating the cover 100. This composite structure also increases the frequency of cover panting modes of vibration as compared to those of a steel cover, resulting in increased durability and reduction in vehicle cabin noise.

The composite body can be a fiber reinforced multiple-ply composite panel constructed with multiple plies of fibers infused with a polymer adhesive, thus providing a rigid and stiff body comprising multiple layers of fibers reinforcing a polymer matrix. The fibers may be glass fibers, carbon fibers, aramid fibers, or the like. This composite structure provides sufficient strength and rigidity for the cover 100 to act as a shear panel, providing structural support for the battery pack and preventing significant deformation from shear forces. It has been found that a 1.5 mm thick multiple-ply fiber reinforced composite panel is of sufficient strength and stiffness for purposes of this disclosure. Any fibers sufficient to provide structural rigidity and strength to act as a shear panel may be used. In some embodiments, the fibers are glass fibers making up less than 50% by weight of the composite body, and in some embodiments, the glass fibers make up less than 30% by weight of the composite body. The polymer may be an epoxy or any other crosslinked polymer that, when cured, provides sufficient rigidity and strength, and ablates in response to applied high temperature flame.

The coating may be any temperature- and abrasion-resistant material. For example, the coating may be a metal layer such as nickel or steel. The coating may also be a high-temperature mineral layer such as mica. The coating may also contain a binder such as epoxy or another highly crosslinked brittle material, and may further be any combination of any of the above, such as a metal layer coupled to a mineral layer, or the like. It has been found that a coating thickness of 50-100 μm provides sufficient hardness and fire resistance for purposes of this disclosure. It is also noted that the coating may be incorporated into the matrix of the composite body so as to be distributed within the matrix itself, rather than being a separate layer. Thus, for instance, the metal or mica of the coating layer may instead be distributed as particles within the matrix of the composite body.

In operation, battery cells are placed and secured within the battery pack (e.g., arranged within one or more battery modules), and the lid is fastened onto the pack with the coating layer facing the batteries. The lid acts as a shear panel in the event of vehicle impact, preventing lateral deformation of the battery pack and any resulting damage to the batteries inside. One or more of the battery cells may be arranged such that if one of the battery cells catches fire, the resulting flame jet is directed upward toward the lid and coating layer, as shown in FIG. 2. In some embodiments, the duration of a typical flame jet is on the order of 2 seconds. As explained above, the flame jet of a battery cell can include both flame and grit material formed from the internal components of the battery cell during a thermal runaway event. The grit material exits the battery cell and can abrade material that it comes into contact with. In the absence of a fire- and abrasion-resistant lid, the flame jet may be sufficient to burn through the lid, allowing flames to endanger other vehicle systems and even enter the passenger compartment. However, it has been found that the composite lid structure of the disclosure directs flame jets laterally away from the passenger compartment and other systems for at least the duration of a typical flame jet, without allowing the flame jet to burn through the lid. That is, the composite lid structures of the disclosure have been found to contain and redirect typical flame jets, preventing them from burning through the lid and endangering the vehicle and passengers. They thus provide the advantages of a steel battery pack cover, while also being lighter and having better acoustic properties.

Figure 3A:
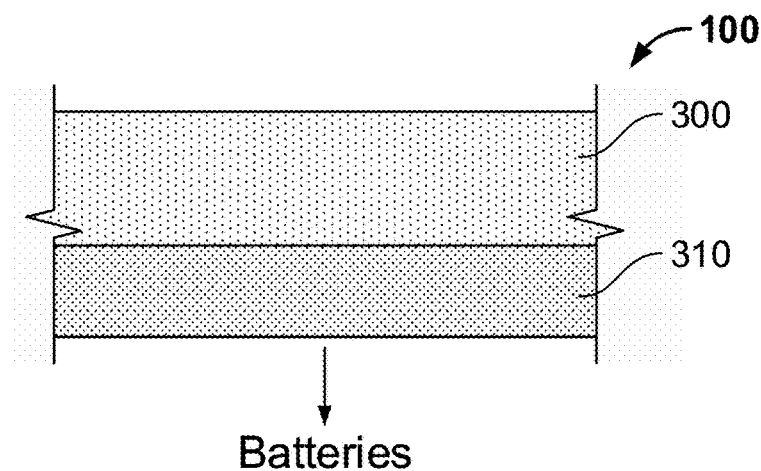
FIGS. 3A-3C are cross-sectional views of battery pack covers constructed in accordance with embodiments of the disclosure.
Figure 3B:
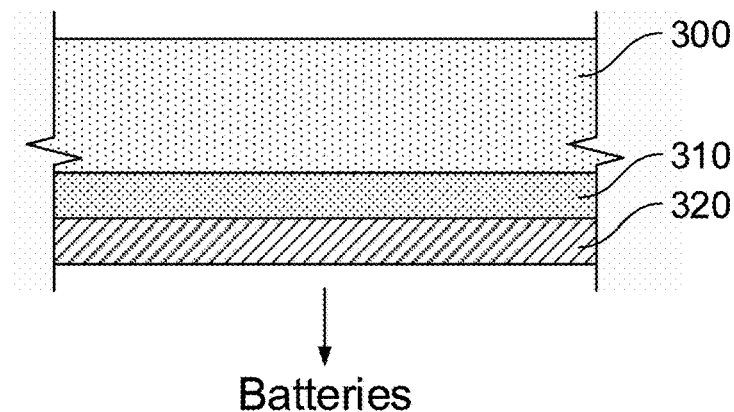
Figure 3C:
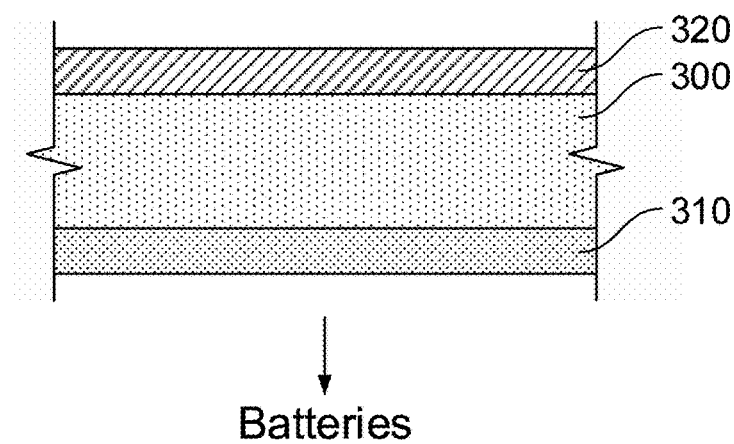

FIGS. 3A-3C are cross-sectional views of battery pack covers constructed in accordance with embodiments of the disclosure. As described above, the various components of cover 100 may be ordered in any manner. FIG. 3A illustrates one such ordering in accordance with embodiments of the disclosure. Here, cover 100 is constructed as a two-layer cover with an upper composite body 300 and a lower coating layer 310 deposited thereon. When assembled, one surface of the coating layer 310 faces and is affixed to the composite body 300, and the opposing surface of the coating layer 310 faces the batteries 200 within frame 110. As described above, the coating layer 310 may be any temperature-and abrasion-resistant material layer, such as a nickel, steel, or mica layer, while the composite body may be a fiber reinforced multiple-ply composite panel constructed with multiple plies of fibers infused with a polymer adhesive. The coating may be of any thickness, although it has been found that a coating of 50-100 µm is sufficient. In some embodiments, the thickness of the coating layer is within 50-100 µm, 50-150 µm, 25-200 µm, or 25-300 µm.

FIG. 3B illustrates another ordering in accordance with embodiments of the disclosure. Here, cover 100 is constructed the same as in FIG. 3A, with the addition of a metallic layer 320 deposited on the coating layer to face the batteries 200 when the battery pack is assembled. The metallic layer 320 provides resistance to electromagnetic interference between the batteries 200 and their associated components, and the vehicle. The metallic layer 320 is affixed to the coating layer 310 in any manner, such as by any adhesive sufficient to secure the metallic layer to the coating layer. The metallic layer 320 may be a single continuous metal layer such as an aluminum foil layer, or may have any added materials such as a glass mesh bonded thereto or incorporated therein. The metallic layer 320 may also be of any thickness, although it has been found that a 0.48 mm aluminum layer provides sufficient resistance to electromagnetic interference in some embodiments. In some embodiments, the thickness of aluminum layer is within 0.45-0.50 mm, 0.40-0.50 mm, 0.40-0.45 mm, or 0.40-0.60 mm. The net thickness of the cover of FIG. 3B, including every layer shown, may be any amount, although a net thickness of 1.5 mm has been found to provide sufficient performance in some embodiments. In some embodiments, the net thickness is within 1.45-1.55 mm, 1.40-1.60 mm, 1.30-1.7 mm, or 1.20-1.80 mm.

FIG. 3C illustrates a further ordering of layers in accordance with embodiments of the disclosure. Here, cover 100 is constructed the same as in FIG. 3A, with the addition of a metallic layer 320 deposited on the composite body 300 to face upward, or opposite the batteries 200 when the battery pack is assembled. The metallic layer 320 may be the same as that described above in connection with FIG. 3B, and may be affixed to the composite body 300 in any manner, such as by any adhesive sufficient to secure the metallic layer 320 to the composite body 300.

In addition to the configurations of FIGS. 3B and 3C, embodiments of the disclosure also contemplate incorporation of the metallic layer into the composite body itself. More specifically, the metallic layer can be configured as one ply of the composite body. The metallic layer may also be positioned between the composite body and the coating layer, affixed to both the composite body and coating layer by, for example, an adhesive as described above.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the invention to the precise forms disclosed. Many modifications and variations are possible in view of the above teachings. For example, any type and number of panel and coating materials may be used, so long as they collectively provide sufficient structural rigidity to act as a shear panel and provide sufficient hardness, fire resistance, and ablative properties to withstand battery fire flame jets and prevent them from burning through the cover. The embodiments were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A cover for an electric vehicle battery pack having a frame defining an interior space within for receiving one or more batteries, the cover comprising:
a shear panel having a fiber reinforced composite layer;
a metallic layer affixed to the shear panel; and
a mica layer directly contacting the metallic layer so as to face the interior space and the batteries when the shear panel is coupled to the frame.

2. The cover of claim 1, wherein the fiber reinforced composite layer comprises a glass fiber reinforced composite layer, a carbon fiber reinforced composite layer, or an aramid fiber reinforced composite layer.

3. The cover of claim 1, wherein the mica layer has a hardness at least sufficient to deflect grit from a jet emitted of the one or more batteries.

4. The cover of claim 1, wherein the mica layer has a melting point temperature greater than a temperature at which ablation of the mica layer occurs.

5. The cover of claim 1, wherein the fiber reinforced composite layer has a thickness of approximately 1.5 mm.

6. The cover of claim 1, wherein the mica layer has a thickness of approximately 50 to approximately 100 µm.

7. The cover of claim 1, wherein the metallic layer comprises aluminum.

8. The cover of claim 7, wherein the metallic layer has a thickness of at least approximately 0.48 mm.

9. The cover of claim 1, wherein the metallic layer comprises a glass mesh.

10. The cover of claim 1, wherein the batteries are positioned within a housing and wherein the mica layer faces the housing when the shear panel is coupled to the frame.

11. The cover of claim 10, wherein the housing is configured to wear away from a jet emitted of the one or more batteries.

12. The cover of claim 1, wherein the mica layer is configured to resist a jet emitted of the one or more batteries and redirect the jet laterally along the mica layer.

13. The cover of claim 1, wherein the metallic layer provides resistance to electromagnetic interference.

14. The cover of claim 1, wherein the fiber reinforced composite layer comprises fibers making up less than 50% by weight of the fiber reinforced composite layer.

15. The cover of claim 1, wherein the fiber reinforced composite layer comprises fibers making up less than 30% by weight of the fiber reinforced composite layer.

16. A cover for an electric vehicle battery pack having a frame defining an interior space within for receiving one or more batteries, the cover comprising:
a metallic layer; and
a mica layer directly contacting the metallic layer so as to face the interior space and the batteries when the cover is coupled to the frame.

17. The cover of claim 16, wherein the mica layer has a thickness of approximately 50 to approximately 100 µm.

18. The cover of claim 16, wherein the metallic layer comprises aluminum.

19. The cover of claim 16, wherein:
the batteries are positioned within a housing;
the mica layer faces the housing when the cover is coupled to the frame; and the housing is configured to wear away from a jet emitted of the one or more batteries.

20. The cover of claim 16, wherein the mica layer is configured to resist a jet emitted of the one or more batteries and redirect the jet laterally along the mica layer.

\* \* \* \* \*